UNITED STATES PATENT OFFICE.

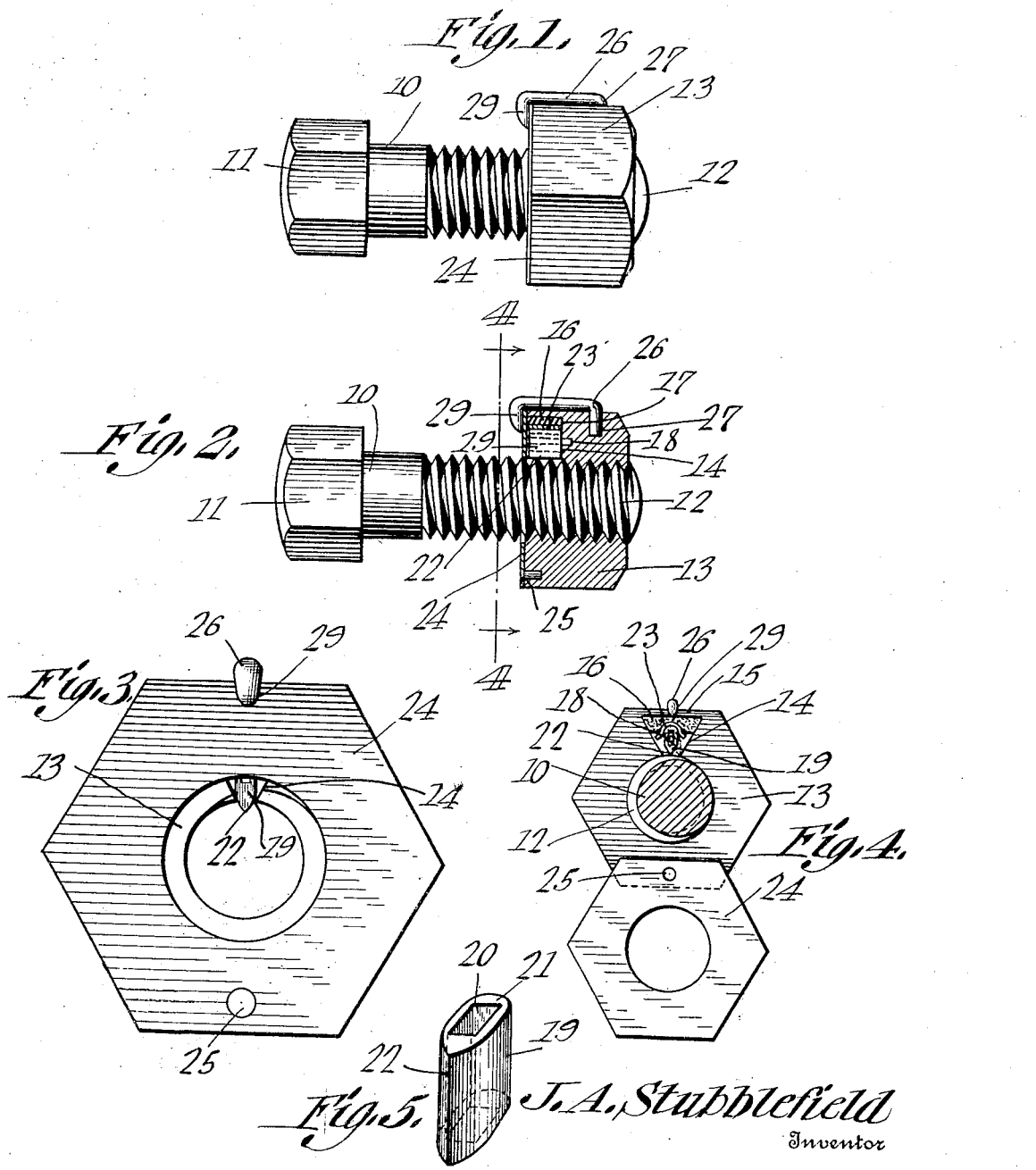

JOHN ARTHUR STUBBLEFIELD, OF OREGON CITY, OREGON.

NUT-LOCK.

1,351,974.  Specification of Letters Patent.  Patented Sept. 7, 1920.

Application filed February 24, 1920. Serial No. 360,588.

*To all whom it may concern:*

Be it known that I, JOHN A. STUBBLEFIELD, a citizen of the United States, residing at Oregon City, in the county of Clackamas and State of Oregon, have invented a new and useful Nut-Lock, of which the following is a specification.

This invention relates to new and useful improvements in nut locks and more particularly to an improved automatic nut lock or means for securing a nut on a bolt from displacement.

The invention further relates to a nut lock of that type in which the nut is provided with means coöperating with the threads of the bolt to prevent turning of the nut on the bolt and thus effectively insure against loosening of the nut and displacement thereof, and the invention comprises a novel and simple construction of engaging means or pawl for coöperation with the threaded shank of the nut, and means to prevent displacement of the pawl from its operative position.

A further object of the invention is to provide an improved nut lock which is automatic in its operation, which may be used or all kinds of heavy machinery and which locks and unlocks automatically by the turning of the nut or bolt, while vibration serves to tighten the same instead of loosening it.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:—

Figure 1 is side elevation of a bolt having a nut engaged thereon and provided with a nut lock or locking device constructed in accordance with the invention.

Fig. 2 is a similar view but showing the nut in section.

Fig. 3 is an enlarged end elevation of the nut.

Fig. 4 is a similar view but showing the retaining plate for the locking device swung to an extended position, in order to show the interior structure, and Fig. 5 is a detailed perspective view of the locking pawl.

Referring to the drawings in detail, in which similar reference characters designate corresponding parts throughout the several views, the numeral 10 designates the bolt having the usual head 11 if desired, while the threaded shank thereof is designated at 12 adapted to be engaged by the nut 13 which is interiorly threaded for this purpose as shown.

In order to lock the nut on the bolt, the nut is provided at its inner face with a substantially triangular or frusto-pyramidal recess 14 taken cross sectionally or viewed in plane, said recess being disposed with its enlarged end outwardly and inclosed by a wall portion 15, while the small end thereof extends into or communicates with the threaded aperture of the nut.

Mounted in the enlarged portion of the recess against the wall 15 is a resilient member, preferably in the form of a flat section of soft resilient or pliable rubber or the like, as designated at 16, although it is to be understood that any suitable spring means may be employed in lieu thereof for a purpose to be subsequently explained. Projecting from the end wall 17 of the recess, which recess extends a short distance of the thickness of the nut, is a pivot pin and guide member 18, the free end thereof terminating adjacent to but preferably inwardly of the inner face of the nut at a spaced distance from the inner face of the member 16. Slidably mounted on this pin is a pawl or locking member 19, particularly shown in Fig. 5 of the drawings and provided with a longitudinal slot 20 for this purpose.

The pawl is adapted for pivotal movement as well as slidable movement on the pin through the medium of the slot 20, which extends between the parallel faces of the pawl, while the lattter is tapered as shown. That is, the pawl is substantially egg-shape in cross section to provide a rounded end 21 and a sharp tapered end 22 providing a cutting edge adapted to project under the action of the resilient or spring member 16, through the restricted or neck portion of the recess 14 into the threaded bore of the nut. Inasmuch as the pawl is engaged on the pin the slot 20 permits this movement and also permits pivotal movement of the pawl laterally to either side in order to move into and out of operative engagement with the threads of the bolt shank, with which it positively engages to hold the nut against turning on the bolt when centrally positioned in the manner shown in Fig. 4 of the drawings. Fitted between the member 16 and the rounded end of the pawl is a curved metal plate 23 which conforms to said end, being rectilinear lengthwise and curved transversely, with its ends bent or flared outwardly at increased arcs so as to engage the sides of the recess and form a compression surface by which the pawl is held in engaged position or against which the pawl may readily move on its pivot.

The plate 23 also serves to prevent mutilation of the compression member and to retain the pawl in position in addition to assisting in its automatic engagement with or disengagement from the bolt. Thus, when the nut is engaged on the bolt the pawl will be turned in a direction opposite to the direction in which the nut is turned, so that when the nut is tightened against the object to be held or clamped, the pawl will bite into the threads of the nut and upon attempt to turn the nut in the reverse direction, the pawl will be moved to a central position in frictional biting engagement with the bolt thereby preventing the nut from becoming displaced. However, by excessive pressure on the nut, which would not be experienced in ordinary use or even in connection with various severe tests on heavy machinery or otherwise, the nut may be turned in a reverse direction so as to remove the same by causing the pawl to swing on its pivot in the reverse direction and to slide on the pivot pin through the medium of the slot 20 therein, this action being facilitated by the plate 23 and the compression of the resilient or spring member 16 which normally urges the pawl to an engaging position.

In order to retain the pawl in the recess, there is provided a retaining plate or washer 24, the same being of hexagonal or other shape to conform to the shape of the nut and being pivoted to the inner face thereof adjacent to one edge as indicated at 25. This pivot serves to mount the plate eccentrically, preferably at a point diametrically opposite to the recess 14 accommodating the pawl, the plate having an aperture alining with the aperture or bore of the nut to receive the bolt therethrough. As indicated, the recess 14 is confined within one of the sector shaped portions of the nut, the limits of which are defined by one side, though of course this relation depends upon the shape of the nut. At any rate, the plate is adapted to cover the recess and retain the parts therein. The plate is secured in this position by suitable means which may consist of a retaining key 26 having one end bent inwardly at right angles as shown at 27 to engage a socket 28 in one side of the nut, the key extending along said side and having its other end bent at right angles to form a tapered retaining portion or lug 29 fitting over the plate and against the same.

The key is detachably or otherwise secured in position, the friction between the parts being sufficient to secure the plate against movement by the wedging action of the key.

Thus, it will be seen that I have provided a very simple and efficient form of nut lock which will be automatic in its operation and which will positively retain a nut on a bolt. The device may be produced without excessive alteration of the nut and without exposing parts of the operative structure, necessitating projections or altering the ordinary appearance of the nut.

Having thus described the invention, what I claim as new is:—

1. In a nut lock, a bolt engaging nut having a bore to receive the bolt therein, a substantially triangular recess in the nut communicating with the bore thereof at one of its apices, the recess being closed at its outer side, a pin rigidly mounted in the end wall of the recess and extending into the same, a tapered pawl having a slot slidably and pivotally engaging the pin and having parallel end walls conforming to the shape of the slot, and a resilient member in the recess at the outer side thereof acting against said pawl and permitting movement thereof slidably to disengage from the bolt or pivotally at either side of the recess to permit turning of the nut in a direction opposite to the side at which the pawl is turned and prevent reverse turning, said pawl serving to lock the nut against turning in an intermediate position.

2. In a nut lock, a bolt engaging nut having a bore to receive the bolt therein, a substantially triangular recess in the nut communicating with the bore thereof at one of its apices, the recess being closed at its outer side, a pin rigidly mounted in the end wall of the recess and extending into the same, a tapered pawl having a slot slidably and pivotally engaging the pin and having parallel end walls conforming to the shape of the slot, a curved bearing plate fitting the end of the pawl remote from the bore, a resilient member mounted in the recess between the plate and the outer side of the recess to hold the pawl centralized or angularly at either side, a plate pivoted to the face of the nut to cover the recess and conforming to the shape thereof, and a key having an end detachably mounted in and at one side of the nut and having a lug parallel substantially to said end and engaging over the plate to frictionally retain the plate in position.

In testimony that I claim the foregoing as my own, I have hereto affixed my signature in the presence of two witnesses.

JOHN ARTHUR STUBBLEFIELD.

Witnesses:
  WILSON T. HUME,
  FLORENCE SARGENT.